United States Patent Office 2,940,821
Patented June 14, 1960

2,940,821

PRODUCTION OF $K_2MnO_4$

Milton B. Carus and Arno H. Reidies, La Salle, Ill., assignors to Carus Chemical Company, La Salle, Ill., a corporation of Illinois No Drawing. Filed Oct. 10, 1956, Ser. No. 615,031

5 Claims. (Cl. 23—58)

This invention relates to the production of $K_2MnO_4$, potassium manganate (VI), by oxidation of $K_3MnO_4$, potassium manganate (V). More particularly, $K_3MnO_4$ is oxidized to $K_2MnO_4$ in an aqueous potassium hydroxide melt. The invention provides a commercially practicable process for producing $K_2MnO_4$ in a potassium hydroxide melt.

Prior to the invention, potassium manganate, $K_2MnO_4$, has been produced for many years, and several methods of production have been devised. A large part of the potassium manganate produced is substantially converted to potassium permanganate. Fundamentally, the reactions involved in the prior production of potassium manganate and potassium permanganate are represented by the following equations:

(1) $MnO_2 + 2KOH + \frac{1}{2}O_2 \rightarrow K_2MnO_4 + H_2O$ (2) $K_2MnO_4 + H_2O \xrightarrow{electr.} KMnO_4 + KOH + \frac{1}{2}H_2$ The present invention is concerned with the production of $K_2MnO_4$ from $K_3MnO_4$, according to the following equation:

(3) $2K_3MnO_4 + \frac{1}{2}O_2 + H_2O \xrightarrow[140\text{-}310°\text{ C.}]{KOH\text{-}H_2O\text{ sol'n}} 2K_2MnO_4\downarrow + 2KOH$ Of the several methods proposed for manufacturing $K_2MnO_4$, the primary commercial method apparently is the roasting method. This involves mixing hot concentrated potassium hydroxide and manganese dioxide, cooling and grinding the mixture. The concentrated potassium hydroxide starting material is produced by evaporating water from aqueous potassium hydroxide up to 385° C. Alternatively, a slurry of 50% KOH and manganese dioxide is sprayed into a hot oven, and the product is cooled and ground. The ground product is then roasted at about 225° C. with air, while intermittently spraying water on the mixture. The roasting is carried out in large rotary drums or tubes. This operation requires a very large amount of equipment, with accompanying high capital investment, power, heat, labor and maintenance requirements. Furthermore, the process is slow, inconsistent and difficult to supervise. The reaction cannot be carried to completion. This is apparently because of the difficulty in supplying sufficient water to the reactants and because sufficient potassium hydroxide cannot be supplied. As regards the former condition, the presence of water is necessary for the reaction although it does not appear on the left of the equation. The potassium hydroxide quantity is limited, because over a certain ratio to manganese dioxide, the product agglomerates seriously and prevents further oxidation.

A number of years ago, a process was devised wherein manganese dioxide was oxidized to $K_2MnO_4$ with air in a concentrated aqueous potassium hydroxide melt. Despite the potential attractiveness of such a process, it has apparently never been successfully employed on a commercial scale. This is very likely due to the fact that during the process, the mixture gets very thick or viscous, so that it is extremely difficult to disperse the oxygen sufficiently for the reaction and a very large provision of power is required in order to agitate the reaction mass at all. This thickening occurs within a period of several hours, even with a much reduced quantity of manganese dioxide in the melt. Also, difficulties occurred in separating the $K_2MnO_4$ from the accompanying materials.

We have found that, apparently, the principal source of trouble is that the manganese dioxide swells up to many times its original volume after a short period of time. Even a small excess of manganese dioxide will swell up to convert the already somewhat viscous liquid into a thick paste.

The present invention provides a process which overcomes the foregoing difficulty of the prior melt oxidation. In particular, the new process involves oxidizing $K_3MnO_4$, which is very soluble, to $K_2MnO_4$ in an aqueous potassium hydroxide melt. The difficulties associated with the presence of manganese dioxide are obviated. Thus, the reaction proceeds with no thickening of the reaction mass or interference with the reaction, and there is no problem of product contamination with unoxidized manganese dioxide.

An additional advantage obtained is that the new process is carried out at an optimum temperature which is substantially lower than the optimum temperature for air oxidation of manganese dioxide, i.e., about 60° lower. As a result, corrosion is materially reduced. The process may also operate at a lower potassium hydroxide concentration. The solids and solutions are handled and processed with less difficulty, and construction, maintenance and operation of the vessels, filters, pumps and other equipment are facilitated.

The new process involves adding $K_3MnO_4$ to an aqueous potassium hydroxide melt, and intimately mixing an oxygen-containing gas with the melt to oxidize the $K_3MnO_4$ to $K_2MnO_4$. Preferably, $K_3MnO_4$ is added to the melt over an extended period of time or periodically, i.e., continuously or intermittently, and $K_2MnO_4$ is removed from the melt over an extended period of time at a rate comparable to its production. In this manner, a continuous type process is provided.

$K_3MnO_4$ may be produced in a practical manner by adding manganese dioxide to an aqueous potassium hydroxide melt, and oxidizing it therein to $K_3MnO_4$ by intimately mixing an oxygen-containing gas with the melt. The reaction takes place according to the following equation:

(4) $2MnO_2 + 6KOH + \frac{1}{2}O_2 \rightarrow 2K_3MnO_4 + 3H_2O$

A rate of manganese dioxide addition is provided which is not substantially greater than its rate of oxidation to $K_3MnO_4$. The melt is maintained at a temperature of about 170° to 350° C., preferably about 240° C. to 300° C. The potassium hydroxide concentration is preferably about 65% to 90% by weight, and it is preferred to maintain a considerable molar excess of potassium hydroxide over the theoretical, e.g., a molar ratio to manganese dioxide on the order of about 30 to 60:1 or greater, which provides a melt of suitable viscosity. The $K_3MnO_4$ produced remains in solution, and it is preferably withdrawn intermittently or continuously at a rate corresponding to its production. This solution may then be used directly as the starting material in the present invention. In this manner, $K_3MnO_4$ is produced while overcoming the prior disadvantages encountered in the production of $K_2MnO_4$ from $MnO_2$. This method of producing $K_3MnO_4$ is described and claimed in our copending application Serial No. 615,032, filed October 10, 1956.

$K_3MnO_4$ may also be produced by oxidizing manganese dioxide in an aqueous potassium hydroxide melt containing a potassium manganate having a manganese valence of greater than 5, i.e., potassium manganate (VI) or potassium permanganate. The manganese dioxide is oxidized to $K_3MnO_4$ by reaction with the potassium manganate. The reaction takes place according to the following equation:

(5) $MnO_2 + 4KOH + K_2MnO_4 \rightarrow 2K_3MnO_4 + 2H_2O$

A rate of manganese dioxide addition is provided which is not substantially greater than its rate of oxidation to $K_3MnO_4$. The reaction is carried out at a temperature of about 170° C. to 310° C., preferably about 220° C. to 260° C. The potassium hydroxide concentration is preferably about 65% to 90%, by weight. It is preferred to provide a considerable molar excess of potassium hydroxide, e.g., a molar ratio to manganese dioxide on the order of about 30 to 60:1 or greater. It is preferred to maintain the average manganese valence in the melt at a value of at least 5, which requires that a stoichiometric amount or greater of potassium manganate (VI) or potassium permanganate be present at all times. It is further preferred to maintain the molar ratio of $K_2MnO_4$ or $KMnO_4$ to manganese dioxide at about 1.4:1 or greater. This method of producing $K_3MnO_4$ is described and claimed in our copending application, Serial No. 615,033, filed October 10, 1956.

The present invention also provides marked improvements in separating and washing $K_2MnO_4$, which avoid contamination of the product with manganese dioxide, increase the conversion yield, and improve the recovery of potassium hydroxide and make further processing feasible. When the $K_2MnO_4$ produced is removed from the reaction zone and separated from the mother liquor, it is accompanied by substantial amounts of $K_3MnO_4$ and potassium hydroxide. We have found that the $K_3MnO_4$ readily disproportionates, producing manganese dioxide and potassium hydroxide, together with potassium manganate (VI). Also, recovery of the potassium hydroxide in an economical manner is difficult.

Without proper washing, the considerable content of concentrated KOH in the $K_2MnO_4$ product separated from the liquor, causes the mass to solidify or freeze at relatively high temperatures, e.g., 140° C. Consequently, it is extremely difficult to convey the product from the filter, and it is also very difficult to leach the solidified mass, to remove the KOH. The fused mass must be ground for leaching, and the $K_3MnO_4$ cannot be removed. Disproportionation of the $K_3MnO_4$ takes place if the product is washed or leached with water or dilute potassium hydroxide, for example, 15% KOH. The manganese dioxide resulting from disproportionation is lost, and it tends to plug the filter and make filtration very difficult. It is also necessary to reconcentrate the adhering excess potassium hydroxide which is recovered and diluted in leaching, for reuse in the process. The mass also freezes when it is attempted to wash it while hot with hot water or dilute potassium hydroxide, the wash solution boiling and reducing the temperature of the mass.

It has been discovered in the invention that these problems are overcome by washing the $K_2MnO_4$ product with aqueous potassium hydroxide of at least 60% potassium hydroxide content, by weight. The product is washed while still hot, with hot wash solution. Disproportionation does not take place employing 60% KOH solution, the mass does not freeze, and $K_3MnO_4$ and most of the potassium hydroxide are recovered for return to the process, and with no necessity for concentrating the wash solution to increase the potassium hydroxide concentration before reuse.

The oxidation of $K_3MnO_4$ according to Reaction 3 is preferably carried out in a melt containing about 65%–90% of potassium hydroxide, by weight. The reaction may be carried out above the solidification point of the mixture, and is preferably carried out at about 140° C. to 310° C. Higher temperatures are preferably avoided, to avoid possible decomposition of $K_2MnO_4$. It is further preferred that the melt be maintained at a temperature of about 210° C. to 230° C.

The reaction proceeds with vigorous agitation while intimately mixing an oxygen-containing gas with the melt. Air is the preferred oxygen-containing gas, for economic reasons, but oxygen, air enriched with oxygen, or a mixture of oxygen and an inert gas might be employed. The oxygen-containing gas is preferably under substantially atmospheric pressure plus any differential required to overcome the resistance to gas flow, but subatmospheric or superatmospheric pressures can be provided with appropriate adjustment of the conditions of temperature and potassium hydroxide concentration. When air is employed, it is preferred to contact the melt with a quantity equivalent to 4 or more times the theoretically required quantity of oxygen.

$K_3MnO_4$ solution is intermittently or continuously introduced into the melt, preferably as it is produced according to one of the above described procedures. It is preferred to maintain a high concentration of $K_3MnO_4$ in the melt, on the order of about 200 to 400 grams per liter, for example. Since the $K_3MnO_4$ is very soluble, it is readily oxidized to $K_2MnO_4$ in the homogeneous solution.

The $K_2MnO_4$ is relatively insoluble and precipitates out of the reaction mixture. It can be separated by conventional methods, such as settling and decantation, centrifugation, or filtration. The reaction can be carried out in batch, semi-continuous or continuous operation. It is preferably carried out in a continuous manner, supplying $K_3MnO_4$ solution to the reaction zone and withdrawing and filtering $K_2MnO_4$ crystals continuously or periodically as they are produced. Aqueous potassium hydroxide solution of at least 50% KOH is added to the melt, to replace the KOH withdrawn with the $K_2MnO_4$.

Conversion of $K_3MnO_4$ to $K_2MnO_4$ approaches the quantitative. The product of Reaction 3 initially contains adherent mother liquor, containing $K_3MnO_4$, concentrated potassium hydroxide and water. After filtering and washing in the above described manner, the crystals contain about 80% to 90% of $K_2MnO_4$, potassium hydroxide, water and minor impurities.

In washing the product, it is preferred that it be washed while still hot, and that it be washed with hot at least 60% aqueous potassium hydroxide. Thus, the product may be washed immediately upon removal from the melt, first separating the crystals from the accompanying liquor, with the aqueous potassium hydroxide at about 100° C. or higher. By this process, the product is prevented from solidifying due to the accompanying high melting potassium hydroxide liquor, while disproportionation is precluded and concentrated reuseable liquor is recovered, as described above. The freezing point of the preferred wash solution of about 60% to 65% potassium hydroxide, is low enough that the mixture of product and wash does not solidify. The washed granular product and the wash solution are well suited for further processing. Since the yields are not affected by decomposition of the $K_3MnO_4$, they are practically quantitative.

The washing process may be carried out in a conventional manner and is preferably carried out by filtering the $K_2MnO_4$ crystals from the liquor on a rotary drum filter, immediately followed by washing with the hot concentrated yet low melting potassium hydroxide solution. Filtration is carried out under vacuum, preferably at a reduced pressure corresponding to 15 inches of mercury or less, without cooling the mass so that it solidifies, that is, maintaining it at a temperature above the solidification point of the concentrated potassium hydroxide liquor. Washing is likewise carried out under vacuum. The filtrate is recycled, to return the $K_3MnO_4$ and KOH to the process, and the wash is used as makeup or feed KOH solution.

Reaction may be carried out in conventional apparatus, such as a vat equipped with suitable means for agitation and heating, and means for dispersing air throughout the batch. Provision is made for introducing the reagents, for withdrawing the products, and for recycling filtrate and washings.

A number of advantages flow from the new process, which is eminently suited for commercial operation. The process can be carried out in batch or in continuous type operation, to produce large quantities of $K_2MnO_4$. Simple and inexpensive equipment is substituted for an entire series of roasters, having the aforementioned disadvantages. The product is obtained in a high state of purity. The dust problem of roasting is eliminated. Operational time is greatly reduced and a much more efficient process is provided. The requirements of air or other oxygen-containing gas are considerably reduced, and an accompanying disadvantage is that correspondingly less carbonate is formed by absorption of carbon dioxide from the air. The air dispersion is much more intimate and the reaction is improved correspondingly. The melt stirs very well, so that the power and heat requirements are low, as is the wear on stirring apparatus.

The following example is furnished to assist in providing a complete understanding of the invention, but it is to be understood that the invention is not limited thereto nor to the quantities, conditions and procedures illustrated therein, which are merely illustrative.

*Example*

150 liters of 80% potassium hydroxide solution, containing 300 grams of $K_3MnO_4$ per liter are placed in a reaction vessel equipped with an efficient agitator and provided with means for introducing air. The solution is prepared according to one of the procedures previously described. The solution or melt is maintained at a temperature of 225° C.

The mixture is agitated vigorously, and in excess of four times the theoretical quantity of oxygen (air) is intimately mixed therewith. Intimate mixture is obtained by violent agitation while introducing air over the mixture, so as to intimately disperse fine bubbles of air in the suspension. Alternatively, air is introduced through a tube directly into the mixture.

Oxidation proceeds at the rate of about 2 grams of $K_3MnO_4$ per liter per minute. The $K_3MnO_4$ consumed is continuously replaced. $K_2MnO_4$ crystallizes out of the reaction mixture, is withdrawn from time to time in the form of a slurry in potassium hydroxide solution, and is separated from the liquor by filtration on a rotary drum filter to which is applied a reduced pressure of about 15 inches of mercury. Makeup potassium hydroxide solution of 50% strength or greater is added to the reaction vessel.

When the hot filter cake on the rotary drum leaves the $K_2MnO_4$ slurry and is sucked dry, the cake is washed with 60% aqueous potassium hydroxide solution at 100° C. The wash is likewise removed from the cake by the application of vacuum, or reduced pressure. The filtrate and wash are used for the production of $K_3MnO_4$ and $K_2MnO_4$.

After washing and removal of the liquor, the crystalline product contains 82% to 90% of $K_2MnO_4$, some potassium hydroxide, water, and minor impurities. The yield based on $K_3MnO_4$ is practically quantitative.

The invention thus provides a new process for producing $K_2MnO_4$ which constitutes a substantial improvement over the prior methods and overcomes their disadvantages. The disadvantages of oxidation from manganese dioxide are overcome, the process is readily regulated for rapid quantitative production, and the product is in a high state of purity. The consumption of materials is a minimum, and the operation is carried out in but a small equipment installation with low investment, power, labor and maintenance requirements. The invention provides a very advantageous solution to the problem of producing $K_2MnO_4$ by an oxidation process in an aqueous potassium hydroxide melt.

The invention is hereby claimed as follows:

1. The process for producing $K_2MnO_4$ which comprises adding $K_3MnO_4$ to an aqueous about 65% to 90% potassium hydroxide melt maintained at a temperature of about 140° C. to 310° C., and intimately mixing an oxygen-containing gas with said melt to oxidize the $K_3MnO_4$ to $K_2MnO_4$.

2. The process for producing $K_2MnO_4$ which comprises adding $K_3MnO_4$ to an aqueous about 65% to 90% potassium hydroxide melt maintained at a temperature of about 140° C. to 310° C., over an extended period of time, intimately mixing an oxygen-containing gas with said melt to oxidize the $K_3MnO_4$ to $K_2MnO_4$, and removing $K_2MnO_4$ from said melt over an extended period of time at a rate comparable to its production.

3. The process for producing $K_2MnO_4$ which comprises adding $K_3MnN_4$ to an aqueous about 65% to 90% potassium hydroxide melt maintained at a temperature of about 140° C. to 310° C., maintaining a $K_3MnO_4$ concentration of about 200 to 400 grams per liter in said melt, and intimately mixing an oxygen-containing gas with said melt to oxidize the $K_3MnO_4$ to $K_2MnO_4$.

4. The process for producing $K_2MnO_4$ which comprises adding $K_3MnO_4$ to an aqueous about 65% to 90% potassium hydroxide melt over an extended period of time, maintaining said melt at a temperature of about 210° C. to 230° C., maintaining a $K_3MnO_4$ concentration of about 200 to 400 grams per liter in said melt, intimately mixing an oxygen-containing gas with said melt to oxidize the $K_3MnO_4$ to $K_2MnO_4$, and removing $K_2MnO_4$ from said melt over an extended period of time at a rate comparable to its production.

5. In an oxidation process for producing $K_2MnO_4$ from $K_3MnO_4$ in an aqueous potassium hydroxide melt, the improvement which comprises filtering the melt while still hot to separate $K_2MnO_4$ crystals containing adherent $K_3MnO_4$ from the liquor, washing the $K_2MnO_4$ crystals while still hot with at least 60% aqueous potassium hydroxide at a temperature of at least about 100° C., and separating the $K_2MnO_4$ crystals from the wash solution by filtration.

References Cited in the file of this patent

UNITED STATES PATENTS

| | | |
|---|---|---|
| 1,826,594 | Bellone | Oct. 6, 1931 |

FOREIGN PATENTS

| | | |
|---|---|---|
| 292,991 | Great Britain | Jan. 31, 1929 |

OTHER REFERENCES

Scholder et al.: "Zeitschrift für anorganische und allgemeine Chemie," Band 277, pages 243–245, 1954.

UNITED STATES PATENT OFFICE
CERTIFICATE OF CORRECTION

Patent No. 2,940,821            June 14, 1960

Milton B. Carus et al.

It is hereby certified that error appears in the printed specification of the above numbered patent requiring correction and that the said Letters Patent should read as corrected below.

Column 5, line 16, for "disadvantage" read -- advantage --; column 6, line 29, for "$K_3MnN_4$" read -- $K_3MnO_4$ --.

Signed and sealed this 6th day of December 1960.

(SEAL)
Attest:

KARL H. AXLINE            ROBERT C. WATSON
Attesting Officer            Commissioner of Patents